United States Patent [19]
Shinohara et al.

[11] Patent Number: 5,871,165
[45] Date of Patent: Feb. 16, 1999

[54] SPINNING REEL FOR FISHING

[75] Inventors: Eiji Shinohara, Tokyo; Tomoyuki Amano, Saitama, both of Japan

[73] Assignee: Daiwa Seiko, Inc., Tokyo, Japan

[21] Appl. No.: 796,943

[22] Filed: Feb. 7, 1997

[30] Foreign Application Priority Data

| Feb. 7, 1996 | [JP] | Japan | 8-045359 |
| Feb. 8, 1996 | [JP] | Japan | 8-046753 |
| Feb. 19, 1996 | [JP] | Japan | 8-001675 |

[51] Int. Cl.$^6$ .................................................. A01K 89/01
[52] U.S. Cl. ........................... 242/321; 242/247; 242/311
[58] Field of Search .................................... 242/247, 248, 242/311, 321, 283, 241; 384/504, 493

[56] References Cited

U.S. PATENT DOCUMENTS

| 3,144,217 | 8/1964 | Wood | 242/248 |
| 4,770,363 | 9/1988 | Tsunoda et al. | 242/321 |
| 4,778,124 | 10/1988 | Shinohara . | |
| 5,308,172 | 5/1994 | Upadhya et al. | 384/493 |
| 5,364,194 | 11/1994 | Lubin | 384/493 |
| 5,503,343 | 4/1996 | Hirano et al. | 242/247 |
| 5,547,140 | 8/1996 | Kawabe et al. | 242/247 |
| 5,570,851 | 11/1996 | Yamaguchi et al. | 242/247 |

FOREIGN PATENT DOCUMENTS

| 64-38964 | 3/1989 | Japan . |
| 4-94969 | 8/1992 | Japan . |
| 6-42461 | 11/1994 | Japan . |

*Primary Examiner*—Katherine Matecki
*Attorney, Agent, or Firm*—Sughrue, Mion, Zinn, Macpeak & Seas, PLLC

[57] ABSTRACT

A spinning reel for fishing includes: a cylindrical drive shaft into which a spool shaft is inserted, rotated being linked with a handle; a front and a rear bearing to rotatably support the cylindrical drive shaft, arranged in a support section formed on the front side of a reel body; and a rotor attached to the cylindrical drive shaft, the rotor having a fishing line guide section to wind a fishing line round a spool arranged at the front section of the spool shaft. At least one of the front and the rear bearing is made up of a rolling bearing, outside portions of both the front and the rear bearing are fixed to and supported by the support section of the reel body in the axial direction, an inner race of one of the front and the rear rolling bearing is fixed to and supported by the cylindrical drive shaft in the axial direction, and an inside portion of the other of the front and the rear rolling bearing is movably arranged with respect to the cylindrical drive shaft in the axial direction. The bearing can be installed without the phase difference between the outer and the inner races, and the smooth rotation of the rotor and the smooth winding operation can be ensured.

5 Claims, 14 Drawing Sheets

SPINNING REEL FOR FISHING

BACKGROUND OF THE INVENTION

The present invention relates to improvements in a spinning reel for fishing in which a fishing line is wound onto a spool by a rotor rotatable in linking with rotation of a handle.

As disclosed in Japanese Examined Utility Model Publication No. 6-42461, there is provided a spinning reel for fishing which is constructed in such a manner that a rotational cylindrical shaft, which has a pinion meshed with a drive gear on a handle shaft for rotating a rotor, is supported by two front and rear rolling bearings arranged in the front portion of a reel body.

However, the above spinning reel for fishing suffers from the following problem. Inner races of the front and the rear rolling bearings are fitted on an outer circumference of the rotational cylindrical shaft with a collar interposed therebetween, and the inner races of the front and the rear rolling bearing are fixed to the rotational cylindrical shaft with a nut together with a cylindrical portion of the rotor. Outer races of the front and the rear rolling bearings are fitted on and fixed to an inner circumference of the rotor support section. Therefore, due to dimensional variations in the length of the collar in the axial direction, a phase difference is caused between the inner race and the outer race of the rolling bearing in the axial direction. Accordingly, the resistance given to the balls by the inner and the outer race are increased. As a result, the bearing is subject to the increased resistance, and it is impossible to rotate the rotor smoothly. Accordingly, the fishing line can not be wound smoothly.

Japanese Unexamined Utility Model Publication No. 64-38964 discloses a spinning reel for fishing having a reverse rotation preventing device which includes a rolling type one-way clutch arranged between the cylindrical drive shaft rotated in linking with the handle and the front portion of the reel body.

However, in the above reverse rotation preventing device, the rolling type one-way clutch is arranged between the bearing in the front portion of the reel body and the tooth portion of the cylindrical drive shaft. Accordingly, an irregular twisting force, which is peculiar to a spinning reel for fishing, acts on the cylindrical drive shaft via the rotor in the case of winding or reversing during fishing, so that the one-way clutch conducting a wedge action with a small clearance is subject to the irregular twisting force. Accordingly, durability of the device is deteriorated, and it is impossible to maintain a reverse rotation preventing function in a positive stable manner. Further, it is difficult to enhance the attaching accuracy when the one-way clutch is attached to the cylindrical drive shaft and the reel body.

The base end portion of the cylindrical drive shaft is supported by the bearing arranged integrally with the reel body, and the rolling type one-way clutch is arranged in the axial direction in the bearing in the front portion of the reel body on the front side of the tooth portion of the cylindrical drive shaft meshed with the drive gear. Therefore, the overall length of the reel body is increased in the longitudinal direction, and the size of the device becomes larger. Therefore, it is impossible to make the entire reel compact while the highly accurate reverse rotation preventing function is maintained by the one-way clutch.

Japanese Unexamined Utility Model Publication No. 4-94969 discloses a double-handle type spinning reel. In order to prevent the bail from returning erroneously by the handle, handle knobs are attached to the pair of arms of the handle.

When the pair of arms are arranged, an unbalanced weight of the handle is improved, so that an unnecessary rotation of the handle can be prevented during casting operation. However, the entire handle weight is increased due to the additional handle knob and the moment of inertia of the handle becomes high. Accordingly, when the fishing line is wound by the handle, an overrun tends to occur, which results in that the fishing line is wound excessively, that is, the fishing line winding property is deteriorated. When the weight of the handle is increased as described above, the weight of the entire reel is increased. Therefore, the weight of the reel body is more biased to the side on which the handle is arranged. Accordingly, when this reel is mounted on a fishing rod, the weight is unbalanced in the transverse direction, and the holdability during fishing operation is deteriorated.

SUMMARY OF THE INVENTION

In view of the above problems, a first object of the present invention is to provide a spinning reel for fishing which is designed so that the bearing can be installed without the phase difference between the outer and the inner races in order to ensure the smooth rotation of the rotor and the smooth winding operation.

The spinning reel for fishing includes: a cylindrical drive shaft into which a spool shaft is inserted, rotated being linked with a handle; a front and a rear bearing to rotatably support the cylindrical drive shaft, arranged in a support section formed on the front side of a reel body; and a rotor attached to the cylindrical drive shaft, the rotor having a fishing line guide section to wind a fishing line round a spool arranged at the front section of the spool shaft. At least one of the front and the rear bearing is made up of a rolling bearing, outside portions of both the front and the rear bearing are fixed to and supported by the support section of the reel body in the axial direction, an inner race of one of the front and the rear rolling bearing is fixed to and supported by the cylindrical drive shaft in the axial direction, and an inside portion of the other of the front and the rear rolling bearing is movably arranged with respect to the cylindrical drive shaft in the axial direction.

A second object of the present invention is to provide a spinning reel for fishing which is designed so that the highly accurate reverse rotation preventing function can be obtained at all times by the wedge action of the rolling type one-way clutch, and that the entire reel can be made compact.

The spinning reel for fishing includes: a cylindrical drive shaft rotated in linking with a handle, into which a spool shaft is inserted; a bearing for rotatably supporting the cylindrical drive shaft, arranged in a support section formed on the front side of a reel body; a rolling type one-way clutch arranged on the rear side of the bearing, allowing the cylindrical drive shaft to rotate in one direction and not allowing the cylindrical drive shaft to rotate in the other direction; and a rotor having a fishing line guide section by which a fishing line is wound round a spool arranged in the front portion of the spool shaft. The bearing is made up of a front bearing and a rear bearing, and the rolling type one-way clutch is arranged between the reel body and the cylindrical drive shaft in a space between the front bearing and the rear bearing.

The cylindrical drive shaft is rotatably supported by the front and the rear bearing, and a sliding member of the reciprocating device of the spool shaft is capable of approaching a position close to a tooth portion of the cylindrical drive shaft meshed with a drive gear mounted on a handle shaft.

An annular retainer to hold rolling members of the rolling type one-way clutch is rotatably supported, and an engaging portion provided in the retainer is engaged with an acting portion of a change-over member supported by the reel body, so that the rolling type one-way clutch can be changed over between an operating state in which a wedge action is performed and a non-operating state in which no wedge action is performed.

A third object of the present invention is to provide a double-handle type fishing reel for fishing which is designed so that the winding operation property and the transverse balance can be improved.

The double-handle type fishing reel includes a handle body having a pair of arms, at both end portions of which handle knobs are attached, and the handle body also having a central portion used as a connecting section to be connected with a drive shaft, wherein through-spaces are formed respectively in the pair of arms.

The handle drive shaft connecting section is connected with a drive winding mechanism of the reel body in which a bail supporting member having a bail is supported by a rotor rotated being linked with the handle while the bail supporting member can be freely changed over between a fishing line winding state and a fishing line drawing state.

A sectional shape of the arm section is substantially formed into a U-shape.

DETAILED DESCRIPTION OF THE PREFERRED EMBODIMENTS

Figure 1:
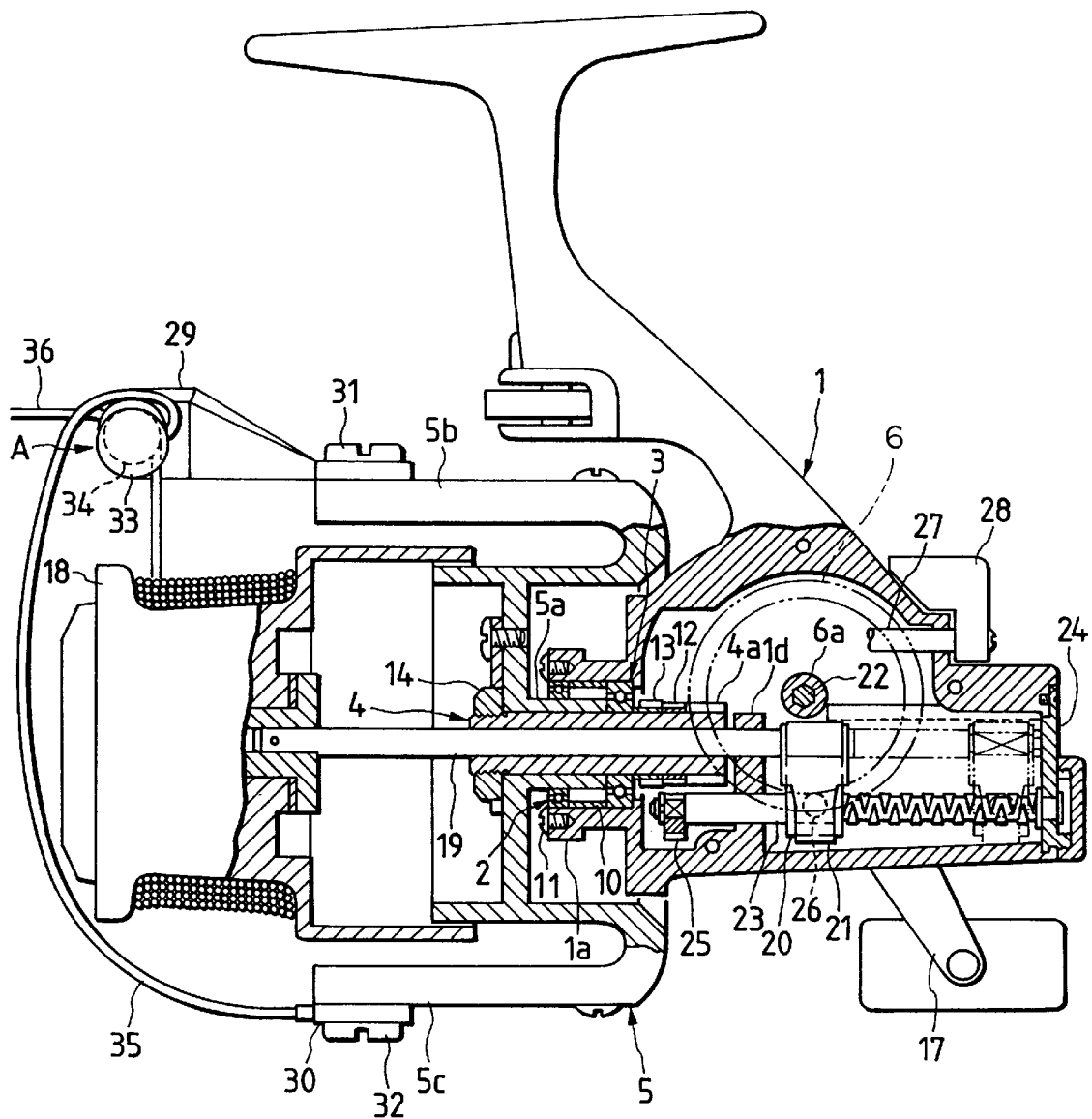
FIG. 1 is a cross-sectional side view showing the primary portion of the spinning reel for fishing of a first embodiment.
Figure 2:
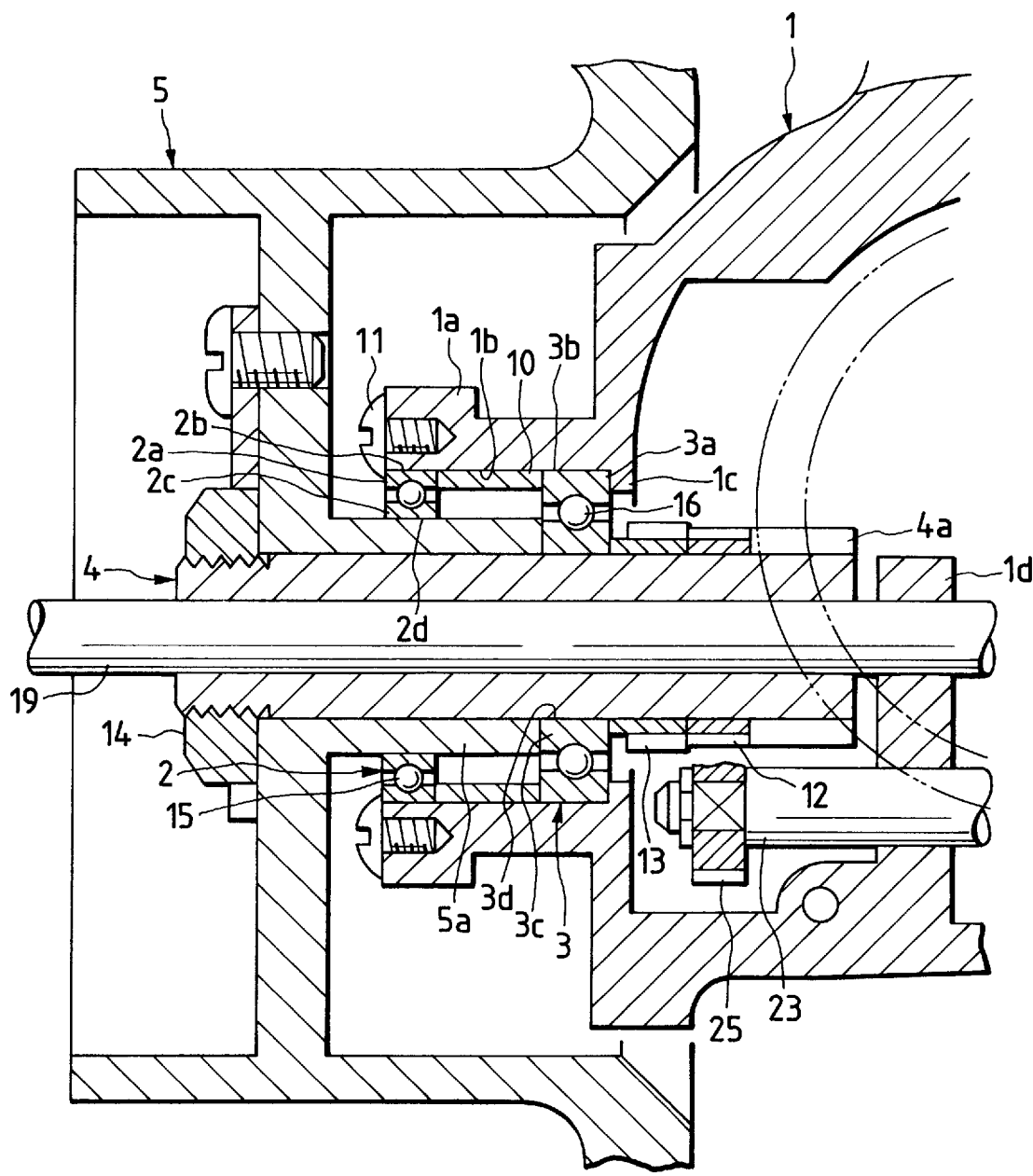
FIG. 2 is an enlarged cross-sectional side view of the primary portion of the spinning reel for fishing of a first embodiment.

The present invention will be explained below with reference to the embodiment shown in the accompanying drawings. FIGS. 1 and 2 are views showing the first embodiment of the present invention. FIG. 1 is a cross-sectional side view of the primary portion of the spinning reel for fishing. FIG. 2 is an enlarged cross-sectional side view of the primary portion of the spinning reel for fishing.

In the spinning reel for fishing illustrated in FIGS. 1 and 2, the cylindrical drive shaft 4 is rotatably supported in the support section 1a on the front side of the reel body 1 by the front bearing 2 made up of a rolling bearing of a small diameter and the rear bearing 3 made up of a rolling bearing of a large diameter.

The outside portion 2b of the outer race 2a of the front bearing 2, the outside portion 3b of the outer race 3a of the rear bearing 3, and the collar 10 are engaged with the inner circumference 1b of the support section 1a. The outer race 3a of the rear bearing 3 comes into contact with the abutment section 1c on the rear side of the support section 1a, and the outside portions 2b, 3b are axially retained by the head portion of the screw 11 that is screwed to a front end of the support section 1a.

On the front side of the base end portion of the cylindrical drive shaft 4, there is integrally provided a pinion 4a. On the front side of the pinion 4a, there are provided an interlocking gear 12 and a reverse rotation preventing ratchet wheel 13 which are non-rotatably fitted on the cylindrical drive shaft 4. On the front side of the reverse rotation preventing ratchet gear 13, the inner race 3c of the rear bearing 3 comes into contact.

The inner race 3c of the rear bearing 3 is fitted on an outer circumference of the cylindrical drive shaft 4. On the front side of the inner race 3c, there is provided a central cylindrical portion 5a of the rotor 5 non-rotatably mounted on the cylindrical device shaft 4 the central cylindrical portion 5a being retained in place by the nut 14 screwed to a front end of the cylindrical drive shaft 4. In this way, the inside portion 3d of the inner race 3c is retained axially.

On the outer circumference of the central cylindrical portion 5a, the inside portion 2d of the inner race 2c of the front side bearing 2 is movably fitted axially.

There are provided balls 15 between the outer race 2a and the inner race 2c of the front bearing 2. Also, there are provided balls 16 between the outer race 3a and the inner race 3c of the rear bearing 3.

The base end portion of the cylindrical drive shaft 4 is rotatably supported by the bearing portion 1d, and the drive gear 6 is meshed with the pinion 4a integrally arranged at the base end portion on the front side. Therefore, the rotor 5 is supported such that it can be rotated in linking with the rotation of the handle 17.

There is provided a spool shaft 19, at the front end of which the spool 18 is attached, passing through the central hole of the cylindrical drive shaft 4 in such a manner that the spool shaft 19 can be slidably reciprocated forward and backward. At the rear end portion of the spool shaft 19, there is mounted a sliding member 20 with an engaging plate 21.

The rotational shaft 6a of the drive gear 6 is supported by a bearing not shown in the drawing, and a handle shaft 22 to which the handle 17 is fixed is inserted into and engaged with a central polygonal hole of the rotational shaft 6a in such a manner that the handle shaft 22 can be replaced transversely.

The interlocking gear 12 and the reverse rotation preventing ratchet wheel 13 are non-rotatably mounted on the cylindrical drive shaft 4 of the reel body 1 forwardly the pinion 4a.

In the reel body 1, there is provided a traverse cam shaft 23, which is a sliding mechanism, in parallel with the spool shaft 19. This traverse cam shaft 23 is supported by the bearing section 1d and the side plate 24 attached onto the rear side of the reel body 1.

At the front end of the traverse cam shaft 23, there is provided a pinion 25 which is non-rotatably fitted on the traverse cam shaft 23 and meshed with the interlocking gear 12 described before.

The sliding member 20 is fitted on the traverse cam shaft 23, and an engaging claw 26 provided in the sliding member 20 is engaged with the cam groove of the traverse cam shaft 23.

The reverse rotation preventing ratchet wheel 13 is opposed to a reverse rotation preventing claw not shown in the drawing in such a manner that the reverse rotation preventing ratchet wheel 13 can be engaged with and disengaged from the reverse rotation preventing claw.

On the front side of the operation lever 27 rotatably attached to the reel body 1, there is provided a reverse rotation preventing claw not shown in the drawing. On the operation lever 27 protruding outwardly from the rear side of the reel body 1, there is provided an operation knob 28.

A pair of bail supporting arms 5b, 5c are provided on the rotor 5. At the outside end portions of the bail supporting arms 5b, 5c, there are provided one bail supporting member 29 and the other bail supporting member 30 in such a manner that they can be turned reversely between the fishing line winding position and the fishing line drawing position. These bail supporting members 29, 30 are attached to the bail supporting arms 5b, 5c by screws 31, 32.

A roller attaching section 33 of the fishing line guide section A is attached to one bail supporting member 29, so that the line roller 34 can be rotatably supported.

The bail 35 is attached between the other bail supporting member 30 and the roller attaching section 33.

In the operation of the above spinning reel for fishing, when the handle 17 is rotated in a direction so that the fishing line 36 can be wound round the spool 18, the drive gear 6 is rotated, and the cylindrical drive shaft 4 and the rotor 5 are rotated in the normal direction via the pinion 4a.

Further, the traverse cam shaft 23 is rotated via the interlocking gear 12 and the pinion 25, so that the sliding member 20, spool shaft 19 and spool 18 are reciprocated back and forth.

When the fishing line 36 is wound round the spool 18, fishing line 36 is guided by the line roller 34 of the fishing line guide section A arranged in the bail support member 29. Therefore, the fishing line 36 can be wound in parallel round the spool 18 reciprocated back and forth.

When the reverse rotation of the rotor 5 is prevented, the operation knob 28, the operation lever 27 and the reverse rotation preventing claw not shown are rotated, so that the reverse rotation preventing claw is engaged with the reverse rotation preventing ratchet wheel 13.

When the rotor 5 is rotated, the winding operation can be smoothly conducted as follows. The cylindrical drive shaft 4 and the central cylindrical portion 5a of the rotor 5 non-rotatably fitted on the cylindrical drive shaft 4 are supported by the front bearing 2 and the rear bearing 3. The outside portion 2b of the front bearing 2 and the outside portion 3b of the rear bearing 3 are retained in place axially, and the inside portion 3d of the inner race 3c is also retained in place axially. Concerning the front bearing 2, the inside portion 2d of the inner race 2c is movably fitted on an outer circumference of the central cylindrical portion 5a of the rotor 5. Because of the above arrangement, no phase difference or no axial disalignment is caused between the outer race 2a and the inner race 2c of the front bearing 2, and between the outer race 3a and the inner race 3c of the rear bearing 3. Therefore, the resisting forces given to the rolling balls 15, 16 by the inner and the outer race are small. Accordingly, the front bearing 2 and the rear bearing 3 can be rotated lightly, so that the rotor 5 can be rotated smoothly. Since the rotor 5 is supported by two bearings, one is the front bearing 2 and the other is the rear bearing 3, even if a force is given onto the line roller 34 side of the fishing line guide section A in the case of drawing out the fishing line 36, the winding operation can be conducted smoothly.

Figure 3:
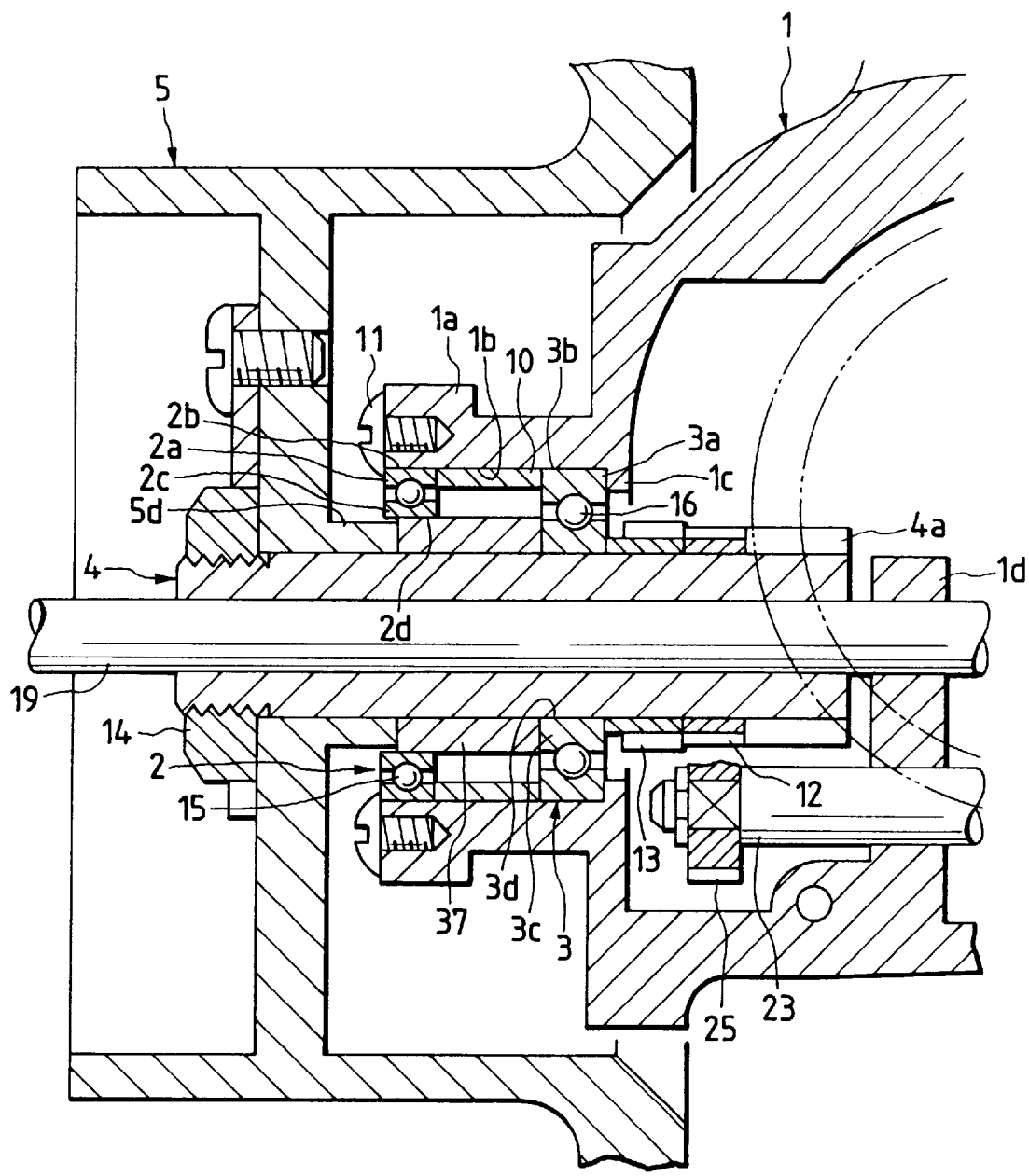
FIG. 3 is an enlarged cross-sectional side view of the primary portion of the spinning reel for fishing of a second embodiment.

FIG. 3 is a view showing the second embodiment of the present invention. FIG. 3 is an enlarged cross-sectional side view of the primary portion of the spinning reel for fishing In the spinning reel for fishing of the second embodiment, the cylindrical drive shaft 4 is rotatably supported by the front bearing 2 made up of a rolling bearing of a small diameter in the support portion 1a on the front side of the reel body 1, and by the rear bearing 3 made up of a rolling bearing of a large diameter.

On the front side of the base end portion of the cylindrical drive shaft 4, there is integrally provided a pinion 4a. On the front side of the pinion 4a, there are provided an interlocking gear 12 and a reverse rotation preventing ratchet wheel 13 which are non-rotatably fitted on the drive shaft 4. On the front side of the reverse rotation preventing ratchet gear 13, the inner race 3c of the rear bearing 3 comes into contact.

The inner race 3c of the rear bearing 3 is fitted on an outer circumference of the cylindrical drive shaft 4, and the collar 37 and a short central cylindrical portion 5d of the rotor 5 are non-rotatably fitted on the drive shaft 4, and retained in place by a nut 14 attached to a front end portion of the cylindrical drive shaft 4. Therefore, the inner race 3c of the rear bearing 3 is retained in place axially.

The outer diameter of the collar 37 is somewhat larger than the outer diameter of the central cylindrical portion 5d, and the inside portion 2d of the inner race 2c of the front bearing 2 is slidably fitted on the outer circumference of the collar 37 so that the inner race 2c can be moved in the axial direction.

Other structure is substantially the same as that of the first embodiment.

When the rotor 5 is rotated in the second embodiment, the cylindrical drive shaft 4 and the central cylindrical portion 5d of the rotor 5 non-rotatably mounted on the cylindrical drive shaft 4, are supported by the front bearing 2 and the rear bearing 3. The outside portion 2b of the front bearing 2 and the outside portion 3b of the rear bearing 3 are retained axially and the inside portion 3d of the inner race 3c is retained axially supported in the contrast, the inside portion 2d of the inner race 2c of the front bearing 2 is axially movably fitted on the outer circumference of the collar 37. Because of the above arrangement, no phase difference or no axially disalignment is caused between the outer race 2a and the inner race 2c of the front bearing 2, and between the outer race 3a and the inner race 3c of the rear bearing 3. Therefore, the resisting forces given to the rolling balls 15, 16 by the inner and the outer race are small. Accordingly, the front bearing 2 and the rear bearing 3 can be rotated lightly, so that the rotor 5 can be rotated smoothly. Since the rotor 5 is supported by two bearings, one is the front bearing 2 and the other is the rear bearing 3, even if a force is given onto the line roller 34 side of the fishing line guide section A in the case of drawing out the fishing line 36, the winding operation can be conducted smoothly.

Figure 4:
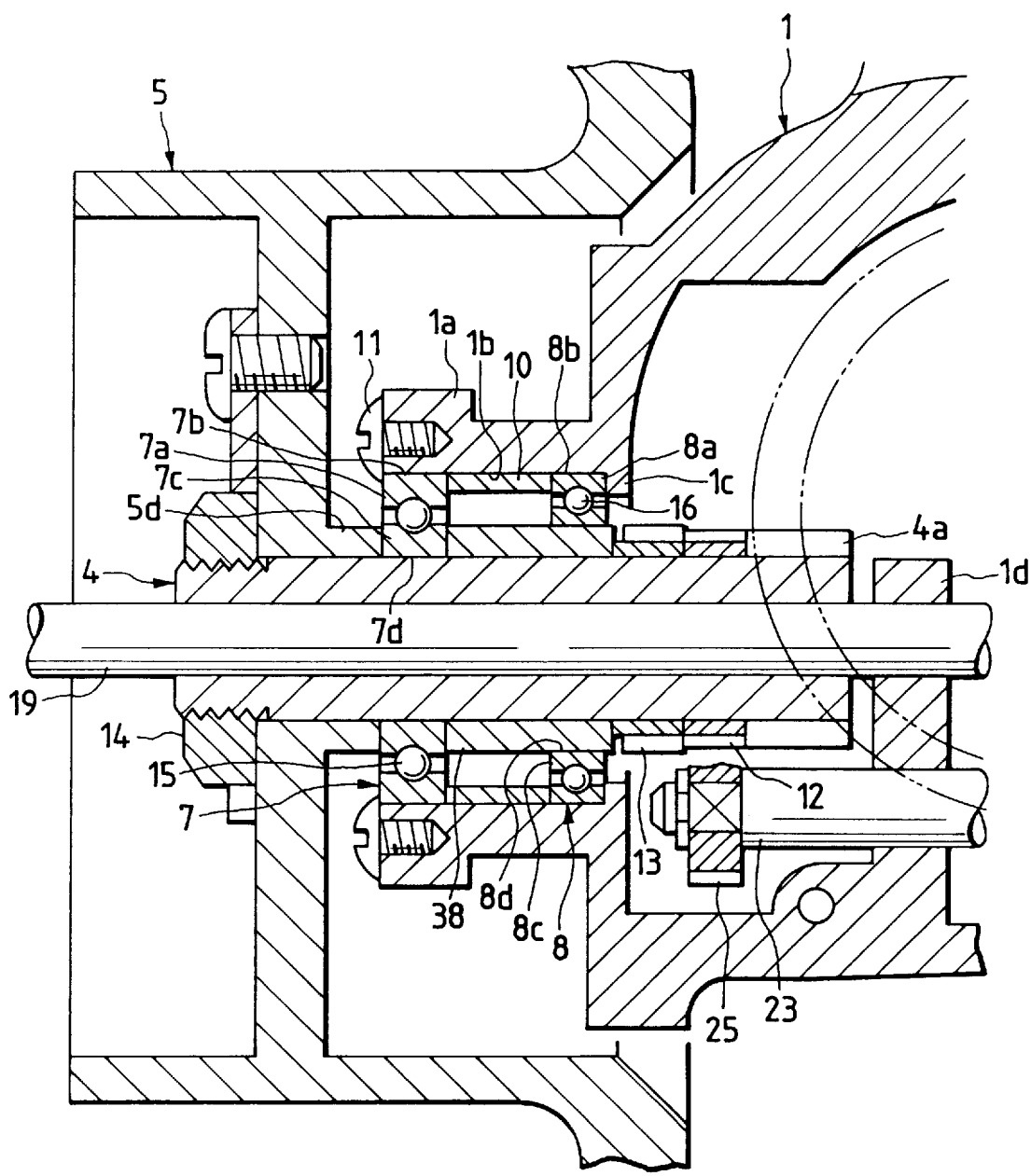
FIG. 4 is an enlarged cross-sectional side view of the primary portion of the spinning reel for fishing of a third embodiment.

FIG. 4 is a view showing the third embodiment of the present invention. FIG. 4 is an enlarged cross-sectional side view of the primary portion of the spinning reel for fishing.

In the spinning reel for fishing of the third embodiment, the cylindrical drive shaft 4 is rotatably supported by the front bearing 7 made up of a rolling bearing of a large diameter in the support portion 1a on the front side of the reel body 1, and by the rear bearing 8 made up of a rolling bearing of a small diameter.

The collar 38 is non-rotatably fitted on an outer circumference of the cylindrical drive shaft 4.

The outside portion 7b of the outer race 7a of the front bearing 7, the outside portion 8b of the outer race 8a of the rear bearing 8, and the collar 10 are fitted on the inner circumference 1b of the support section 1a. The outer race 8a of the rear bearing 8 comes into contact with the abutment section 1c on the rear side of the support section 1a, and the outside portions 7b, 8b are retained in place axially by the head portion of the screw 11 that is screwed to a front end of the support section 1a.

The inner race 7c of the front bearing 7 is fitted on an outer circumference of the small diameter portion 4c of the cylindrical drive shaft 4, and the inside portion 8d of the inner race 8c of the rear bearing 8 is axially movably fitted on an outer circumference of the collar 38.

The short central cylindrical portion 5d of the rotor 5 is non-rotatably fitted on the outer circumference of the cylindrical drive shaft 4. The central cylindrical portion 5d, the inner race 7c of the front bearing 7 and the collar 38 are attached by the nut 14 screwed to the front end of the cylindrical drive shaft 4. Therefore, the inner race 7c is retained in place axially.

Rolling balls 15 are set into a space between the outer race 7a and the inner race 7c of the front bearing 7, and rolling balls 16 are set into a space between the outer race 8a and the inner race 8c of the rear bearing 8.

Other structure is the same as that of the first embodiment.

When the rotor 5 is rotated in the third embodiment, the cylindrical drive shaft 4 and the central cylindrical portion 5d of the rotor 5 non-rotatably fitted on the cylindrical drive shaft 4, are supported by the front bearing 7 and the rear bearing 8. The outside portion 7b of the outer race 7a of the front bearing 7 and the outside portion 8b of the outer race 8a of the rear bearing 8 are retained axially, and the inside portion 7d of the inner race 7c of the front bearing 7 is retained axially. Further, the inside portion 8d of the inner race 8c of the rear bearing 8 is axially movably fitted. Because of the above arrangement, no phase difference or no axial disalignment is caused between the outer race 7a and the inner race 7c of the front bearing 7, and between the outer race 8a and the inner race 8c of the rear bearing 8. Therefore, the resisting forces given to the rolling balls 15, 16 by the inner and the outer race are small. Accordingly, the front bearing 7 and the rear bearing 8 can be rotated lightly, so that the rotor 5 can be rotated smoothly. Since the rotor 5 is supported by two bearings, one is the front bearing 7 and the other is the rear bearing 8, even if a force is given onto the line roller 34 side of the fishing line guide section A in the case of drawing out the fishing line 36, the winding operation can be conducted smoothly.

Figure 5:
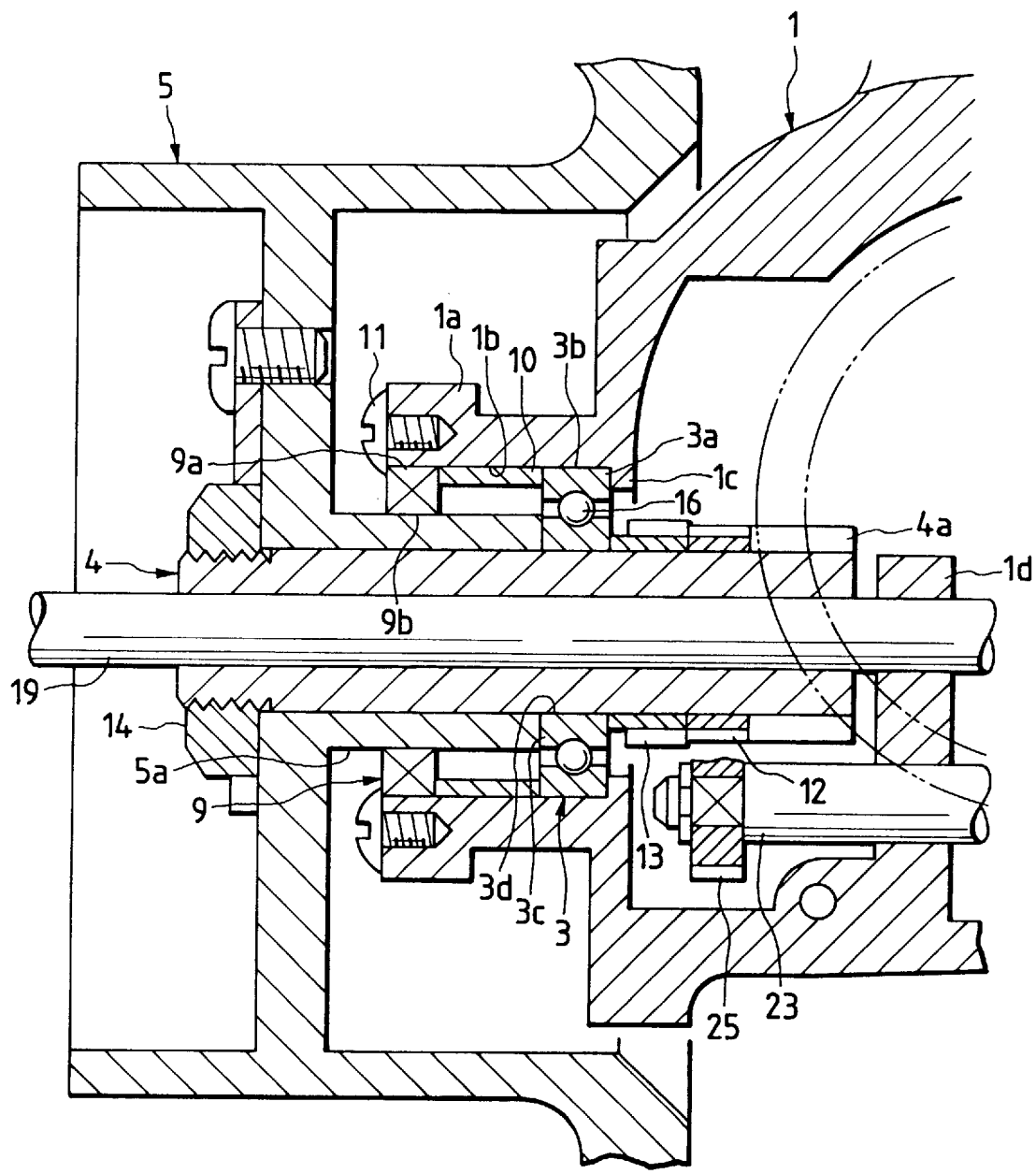
FIG. 5 is an enlarged cross-sectional side view of the primary portion of the spinning reel for fishing of a fourth embodiment.

FIG. 5 is a view showing the fourth embodiment of the present invention. FIG. 5 is an enlarged cross-sectional side view of the primary portion of the spinning reel for fishing.

In the spinning reel for fishing of the fourth embodiment, the cylindrical drive shaft 4 is rotatably supported by the front bearing 9 made up of a metal bearing of a small diameter in the support portion 1a on the front side of the reel body 1, and by the rear bearing 3 made up of a rolling bearing of a large diameter.

The outside portion 9a of the front bearing 9, the outside portion 3b of the outer race 3a of the rear bearing 3, and the collar 10 are fitted on the inner circumference 1b of the support section 1a. The outer race 3a of the rear bearing 3 comes into contact with the abutment section 1c on the rear side of the support section 1a, and the outside portions 9a, 3b are axially retained in place by the head portion of the screw 11 that is screwed to a front end of the support section 1a.

In this case, the metal bearing may be replaced with a synthetic resin bearing.

On the front side of the inner race 3c of the rear bearing 3 on the outer circumference of the cylindrical drive shaft 4, the central cylindrical portion 5a of the rotor 5 is non-rotatably fitted, and the central cylindrical portion 5a is attached by the nut 14 screwed to the front end of the cylindrical drive shaft 4, and the inside portion 3d of the inner race 3c is retained in place axially.

The inside portion 9b of the front bearing 9 is axially movably fitted on the outer circumference of the central cylindrical portion 5a.

Rolling balls 16 are set between the outer race 3a and the inner race 3c of the rear bearing 3.

Other structure is the same as that of the first example.

When the rotor 5 is rotated in the fourth embodiment, the cylindrical drive shaft 4 and the central cylindrical portion 5a of the rotor 5 non-rotatably fitted on the cylindrical drive shaft 4 are supported by the front bearing 9 and the rear bearing 3. The outside portion 9a of the outside portion 9a of the front bearing 9 and the outside portion 3b of the rear bearing 3 are axially retained, and the inside portion 3d of the inner race 3c is axially retained. Further, the inside portion 9b of the front bearing 9 is axially movably fitted engaged on the outer circumference of the central cylindrical portion 5a of the rotor 5. Because of the above arrangement, no phase difference or no axial disalignment is caused between the outer race 3a and the inner race 3c of the rear bearing 3. Therefore, the resisting forces given to the rolling balls 16 by the inner and the outer race can be reduced. Accordingly, the rear bearing 3 can be rotated lightly, and the rotor 5 can be rotated smoothly. Since the rotor 5 is supported by two bearings, one is the front bearing 9 and the other is the rear bearing 3, even if a force is given onto the line roller 34 side of the fishing line guide section A in the case of drawing out the fishing line 36, the winding operation can be conducted smoothly.

Since the spinning reel for fishing of the present invention is composed as described above, it is possible to provide the following excellent effects. The outside portions of the front and the rear bearing are interposed and supported in the axial direction, and the inner race of one of the rolling bearings is interposed and supported in the axial direction, and the inside portion of the other bearing is arranged so that it can be freely moved in the axial direction. Accordingly, no phase difference is caused between the outer race and the inner race of the bearing, so that the rotational resistance can be reduced and a load given to the bearing can be reduced. As a result, the rotor can be smoothly rotated. Since the rotor is supported by the two bearings, even if a force is given to the fishing line guide section while the fishing line 36 is being drawn out, the winding operation can be carried out smoothly.

FIGS. 6 to 9 are views showing the fifth embodiment of the present invention.

Figure 6:
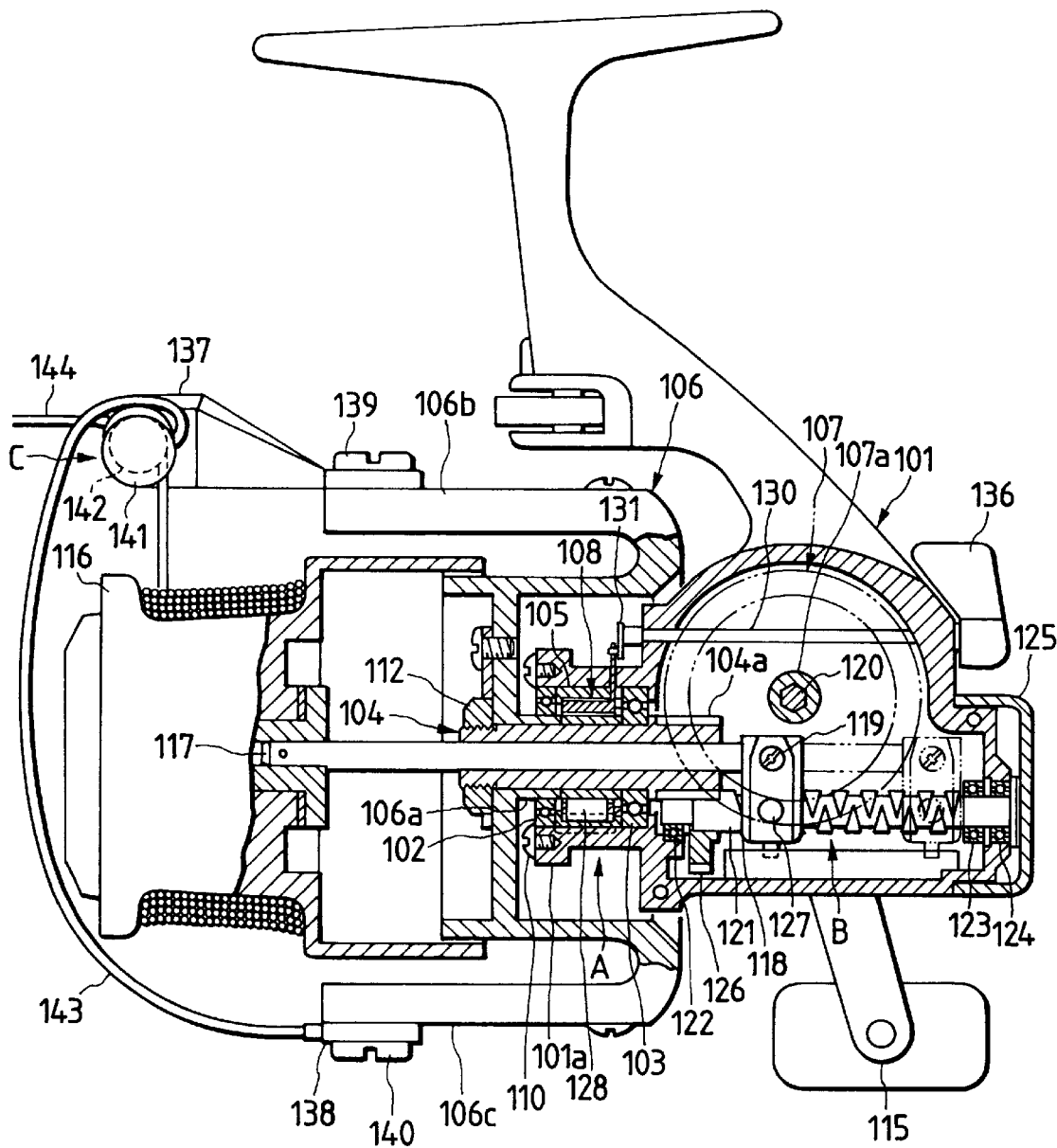
FIG. 6 is a cross-sectional side view of the primary portion of the spinning reel for fishing of a fifth embodiment.
Figure 7:
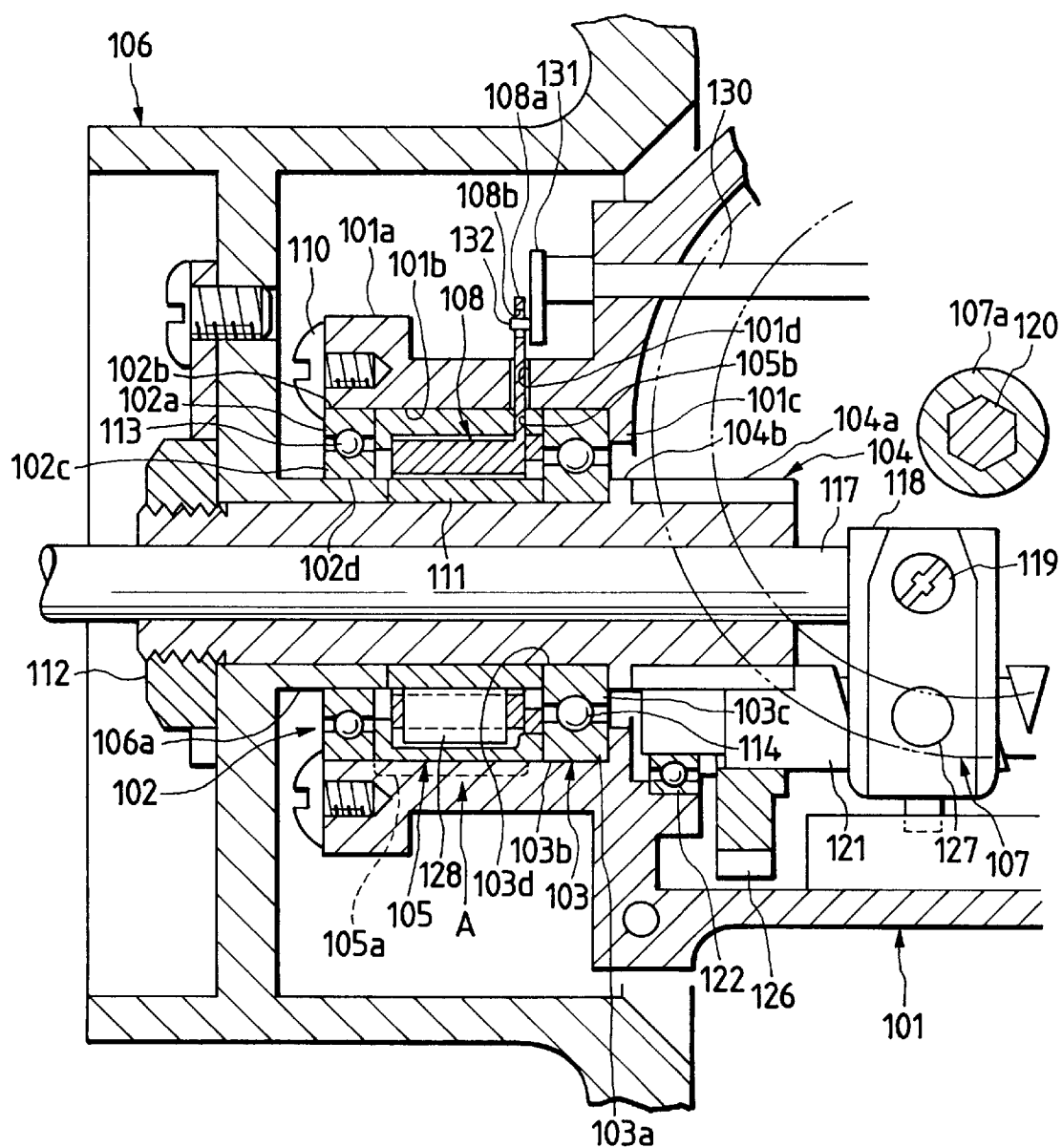
FIG. 7 is an enlarged cross-sectional side view of the primary portion of the spinning reel for fishing.

In the spinning reel for fishing illustrated in FIGS. 6 and 7, the cylindrical drive shaft 104 is rotatably supported in the support section 101a on the front side of the reel body 101 by the front bearing 102 made up of a rolling bearing of small diameter, a rolling type one-way clutch A and the rear bearing 103 made up of a rolling bearing of a large diameter.

The outside portion 102b of the outer race 102a of the front bearing 102, the outside portion 105a of the outer frame 105 of the one-way clutch A and the outside portion 103b of the outer race 103a of the rear bearing 103 are fitted on the inner circumference 101b of the support portion 101a.

The abutment portion 101c on the rear side of the support section 101a comes into contact with the outer race 103a of the rear bearing 103, and the head portion of the screw 110 attached to the fore end of the support section 110a prevents the removal of the front bearing 102, the rolling type one-way clutch A and the rear bearing 103 while the outside portions 102b and 103b are retained in place axially. Further, the outside portion 105a of the outer frame 105 is non-rotatably fitted on the inner circumference 101b of the support section 101a.

On the front side of the base end of the cylindrical drive shaft 104, there are integrally formed a tooth portion or pinion 104a and a abutment portion 104b. The abutment portion 104b comes into contact with the inner race 103c of the rear bearing 103.

The inner race 111 of the rolling type one-way clutch A and the central cylindrical portion 106a of the rotor 106 is fitted on the outer circumference of the cylindrical drive shaft 104 forwardly of the inner race 103c of the rear bearing 103. The inner race 111 and the central cylindrical portion 106a are non-rotatably fitted thereon, and axially retained in place by the nut 112 screwed to the front end of the cylindrical drive shaft 104. Therefore, the inside portion 103d of the inner race 103c is axially retained in place.

The inside portion 102d of the inner race 102c of the front bearing 102 is axially movably fitted on the outer circumference of the central cylindrical portion 106a.

There are provided rolling balls 113 between the outer race 102a and the inner race 102c of the front bearing 102. Also, there are provided balls 114 between the outer race 103a and the inner race 103c of the rear bearing 103.

The front bearing 102 made up of a rolling bearing of a small diameter may be replaced with a metallic bearing or a synthetic resin bearing.

In this embodiment, there is provided a cap 125 on the rear side of the reel body 101.

Figure 8:
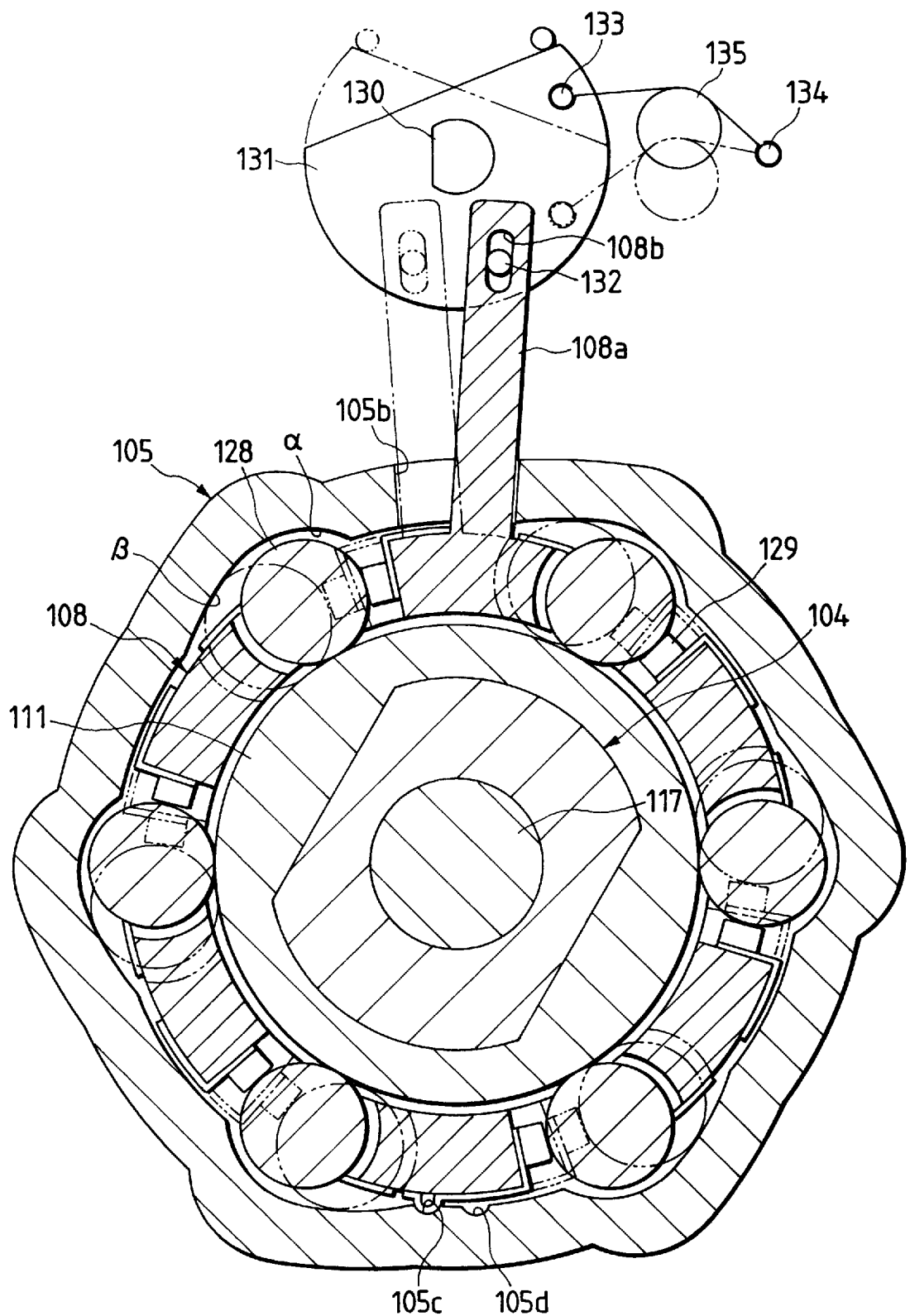
FIG. 8 is an enlarged cross-sectional front view of the rolling type one-way clutch.
Figure 9:
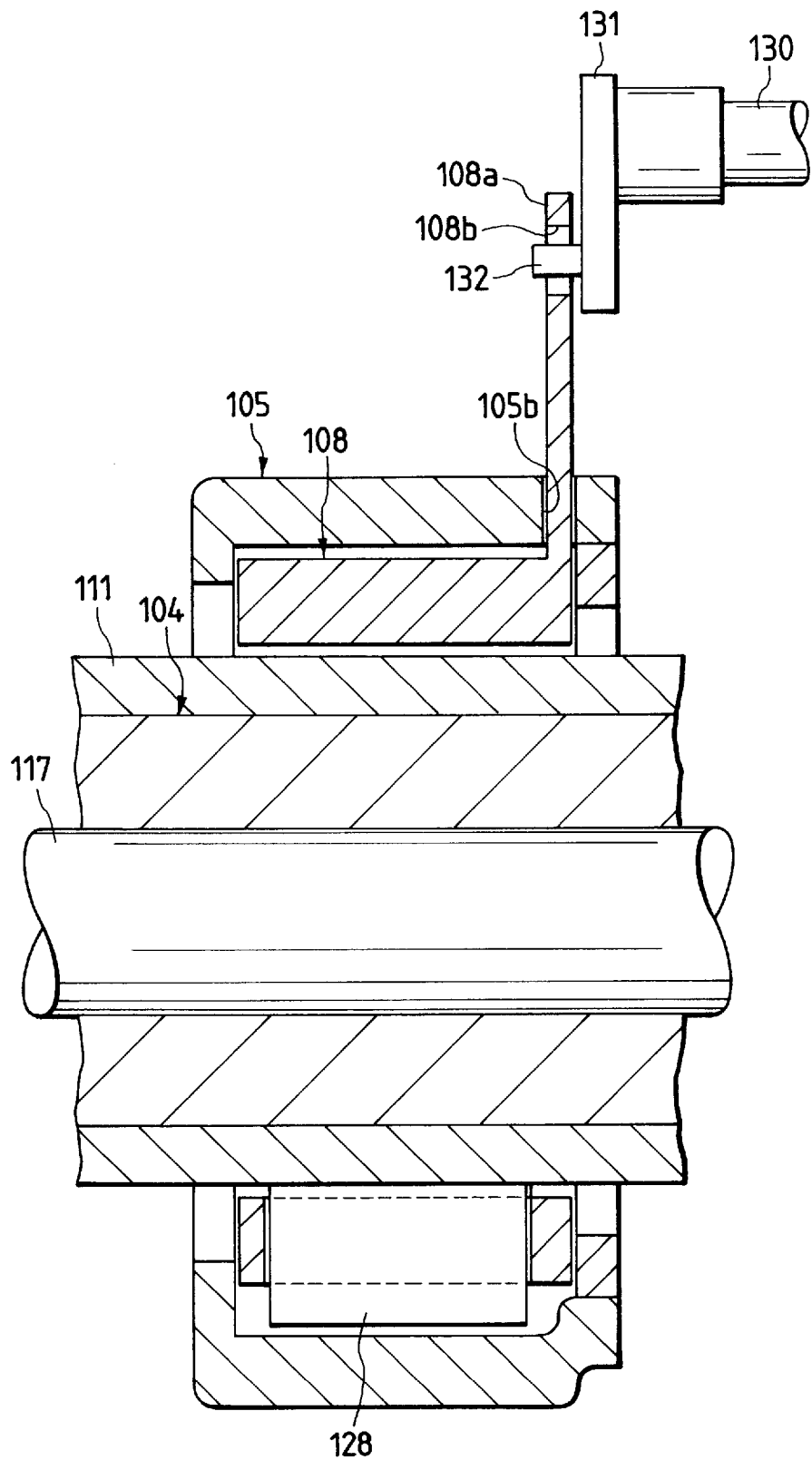
FIG. 9 is an enlarged cross-sectional side view of the rolling type one-way clutch.

As illustrated in FIGS. 8 and 9, the rolling type one-way clutch A includes: an external frame 105, an inner race 111, a plurality of rod-shaped rolling members 128 provided on the outer circumference of the inner race 111, an annular retainer 108, and springs 129.

The plurality of rod-shaped rolling members 128 are inserted into and held by a plurality of through-holes of the annular retainer 108. These rod-shaped rolling members 128 are pushed by the springs 129.

On the inner circumferential surface of the external frame 105, there are formed a freely rotating region α for the rod-shaped rolling members 128, and a checking surface β to check the rotation of the rod-shaped rolling members 128 when it comes into contact with the rod-shaped rolling members 128.

Further, on the inner circumferential surface of the external frame 105, there are formed recesses 105c, 105d for click-stopping with which the protrusions of the springs 129 are engaged.

On one side of the annular retainer 108, there is provided a lever 108a, which is inserted into a through-hole 105b of the external frame 105 and a through-hole 101d of the support section 101a, and protrudes outside the support section 101a.

At the end of the lever 108a, there is provided an engaging section 108b in which a through-hole is formed.

There is provided an operation lever 130 rotatably attached to the reel body 101. On the front side of the operation lever 130, there is provided a change-over member 131, and the operating section 132 made up of a pin fixed to the change-over member 131 is inserted into the engaging section 108b.

Between the pin 133 fixed to the change-over member 131 and the pin 134 fixed to the reel body 101, there is provided a dead point spring 135.

An operation knob 136 is attached to the operation lever 130 protruding outside of the rear side of the reel body 101.

Referring to FIGS. 6 and 8, operation of the rolling type one-way clutch A is described as follows. The operation knob 136, the operation lever 130 and the change-over member 131 are operated and rotated to the positions shown by solid lines in FIG. 8. Then the lever 108a of the annular retainer 108 is rotated clockwise, and the rod-shaped rolling member 128 is placed in the freely rotating region α, that is, the rod-shaped rolling member 128 is put in a non-operating state in which no wedge action is performed. Accordingly, it is possible for the rotor 106 and the cylindrical drive shaft 104 to be rotated normally and reversely.

The operation knob 136, the operation lever 130 and the change-over member 131 are operated and rotated to the positions shown by two-dotted chain lines in FIG. 8. Then the lever 108a of the annular retainer 108 is rotated counterclockwise, and the rod-shaped rolling member 28 is contacted and placed on the checking surface β by which the rotation is checked, that is, the rod-shaped rolling member 128 is put in an operating state in which a wedge action is performed. When the rotor 106 and the cylindrical drive shaft 104 are rotated normally, it is possible for the rod-shaped rolling member 128 to be moved clockwise, resisting a force generated by the spring 129, however, in the case of a reverse rotation, the rod-shaped rolling member 128 comes into contact with the check surface β. Therefore, the reverse rotation is stopped because of a wedge action caused by the check surface β.

Operation of the above spinning reel for fishing is described as follows. The operation knob 136, the operation lever 130, the change-over member 131 and the annular retainer 108 are operated and rotated. Then the rod-shaped rolling members 128 shown by solid lines in FIG. 8 are put in the non-operating state in which no wedge action is performed in the freely rotating region α. In this non-operating state, when the handle 115 is rotated in a direction so that the fishing line 144 can be wound round the spool 116, the drive gear 107 is rotated, and the cylindrical drive shaft 104 and the rotor 106 are normally rotated via the tooth portion 104a.

In accordance with that, the traverse cam shaft 121 is rotated via the pinion 125, and the sliding member 118, the spool shaft 117 and the spool 116 are reciprocated back and forth.

In the case of winding the fishing line 144 round the spool 116, the fishing line 144 is guided by the line roller 142 of the fishing line guide section C attached to one bail support member 137, so that the fishing line 144 is wound in parallel round the spool 116 being reciprocated back and forth.

In the case of preventing the reverse rotation of the rotor 106, the operation knob 136, the operation lever 130, the change-over member 131 and the annular retainer 108 are operated and rotated. Therefore, the rod-shaped rolling member 128 shown by a two-dotted chain line in FIG. 8 is contacted and placed on the check surface β by which the rotation of the rod-shaped rolling member is checked. In this way, the rod-shaped rolling member is changed over to an operation state in which the wedge action is performed.

When the fishing line 144 is drawn out by the tension applied by fish, and the rotor 106 is reversed counterclockwise, the cylindrical drive shaft 104 and the rotor 106 are reversed.

However, the rod-shaped rolling member 128 is contacted with the check surface β, so that the rotation is checked. Therefore, the reverse rotation is prevented by the wedge action.

Play during the reverse rotation before the rod-shaped rolling member 128 performs the wedge action is very small, so that, reverse rotation of the rotor 106 can be very quickly stopped.

Since the cylindrical drive shaft 104 and the central cylindrical portion 106a of the rotor 106 engaged with the cylindrical drive shaft 104 are supported by the front bearing 102 and the rear bearing 103 and since the rolling type one-way clutch A is arranged between the front bearing 102 and the rear bearing 103, an irregular twisting force acting on the rolling type one-way clutch A via the rotor 106 and the cylindrical drive shaft 4 in the case of winding or reversing the fishing line can be reduced, and the attaching accuracy of the cylindrical drive shaft can be stabilized and enhanced, and further the durability can be improved. As a result, the highly accurate reverse rotation preventing function of the rolling type one-way clutch A provided by the wedge action can be stably performed.

The cylindrical drive shaft 104 is rotatably supported by the front bearing 102 and the rear bearing 103, and the traverse cam shaft 121 of the longitudinal reciprocating device B is supported by the front bearing 122 and the rear bearings 123, 124 in the reel body 101, and the pinion 126 engaged with the end of the traverse cam shaft 121 is meshed with the tooth portion 104a of the cylindrical drive shaft 104. Accordingly, it is unnecessary to provide a bearing portion at the base end of the cylindrical drive shaft 104 in the reel body 101, and it is possible to make the sliding member 118 of the longitudinal reciprocating device B approach a position close to the tooth portion 104a of the cylindrical drive shaft 104 to be meshed with the drive gear 107 on the handle shaft 120.

The annular retainer 108 to hold the rolling members 128 of the rolling type one-way clutch A is rotatably supported, and the engaging portion 108b arranged in the annular retainer 108 is engaged with the operation portion 132 of the change-over member 131 supported by the reel body 101, so that the rolling type one-way clutch A can be changed over between the operating state in which the wedge action is performed and the non-operating state in which no wedge action is performed. Because of the foregoing arrangement, play of the rod-shaped rolling member 128 before it performs the wedge action is further reduced in case of the reverse rotation. Accordingly, reverse rotation of the rotor 106 can be very quickly stopped.

When the rotor 106 is rotated, the cylindrical drive shaft 104 and the central cylindrical portion 106a of the rotor 106 non-rotatably fitted on the cylindrical drive shaft 104 are supported by the front bearing 102 and the rear bearing 103, and the outside portion 102b of the front bearing 102 and the outside portion 103b of the rear bearing 103 are axially retained, and the inside portion 103d of the inner race 103c is axially retained. Since the inside portion 102d of the inner race 102c of the front bearing 102 is axially movably fitted on the outer circumference of the central cylindrical portion 106a of the rotor 106, no phase difference or no axial disalignment is caused between the outer race 102a and the inner race 102c of the front bearing 102 and between the outer race 103a and the inner race 103c of the rear bearing 103. Therefore, the resisting forces given to the rolling balls 113, 114 by the inner and the outer race can be reduced. Accordingly, the front bearing 102 and the rear bearing 103 can be rotated lightly, and the rotor 106 can be rotated smoothly. Since the rotor 106 is supported by two bearings, one is the front bearing 102 and the other is the rear bearing 103, even if a force is given onto the line roller 142 side of the fishing line guide section C in the case of drawing out the fishing line 144, the winding operation can be conducted smoothly.

Because of the above arrangement of the spinning reel for fishing, since the cylindrical drive shaft 104 and the central cylindrical portion 106a of the rotor 106 are supported by the front bearing 102 and the rear bearing 103 and since the rolling type one-way clutch A is arranged between the front bearing 102 and the rear bearing 103, an irregular twisting force acting on the rolling type one-way clutch A via the rotor 106 and the cylindrical drive shaft 104 in the case of winding or reversing the fishing line can be reduced, and the attaching accuracy of the cylindrical drive shaft can be stabilized and enhanced, and further the durability can be improved. As a result, the highly accurate reverse rotation preventing function of the rolling type one-way clutch A provided by the wedge action can be stably performed.

When the operation knob 136, the operation lever 130, the change-over member 131 and the annular retainer 108 are operated, the rolling members 128 of the rolling type one-way clutch A can be changed over between an operating state in which the wedge action is performed and a non-operating state in which no wedge action is performed. Therefore, play of the rod-shaped rolling member 128 before it performs the wedge action is further reduced in the reverse rotation. Accordingly, reverse rotation of the rotor 106 can be very quickly stopped.

In the spinning reel for fishing described above, the cylindrical drive shaft 104 is rotatably supported by the front bearing 102 and the rear bearing 103, and the sliding member 118 of the longitudinally reciprocating device B is capable of approaching a position close to the tooth portion 104a of the cylindrical drive shaft 104 meshed with the drive gear 107 mounted on the handle shaft 120. Accordingly, it is possible to make the entire reel compact while the highly accurate reverse rotation preventing function is maintained by the rolling type one-way clutch A.

Figure 10:
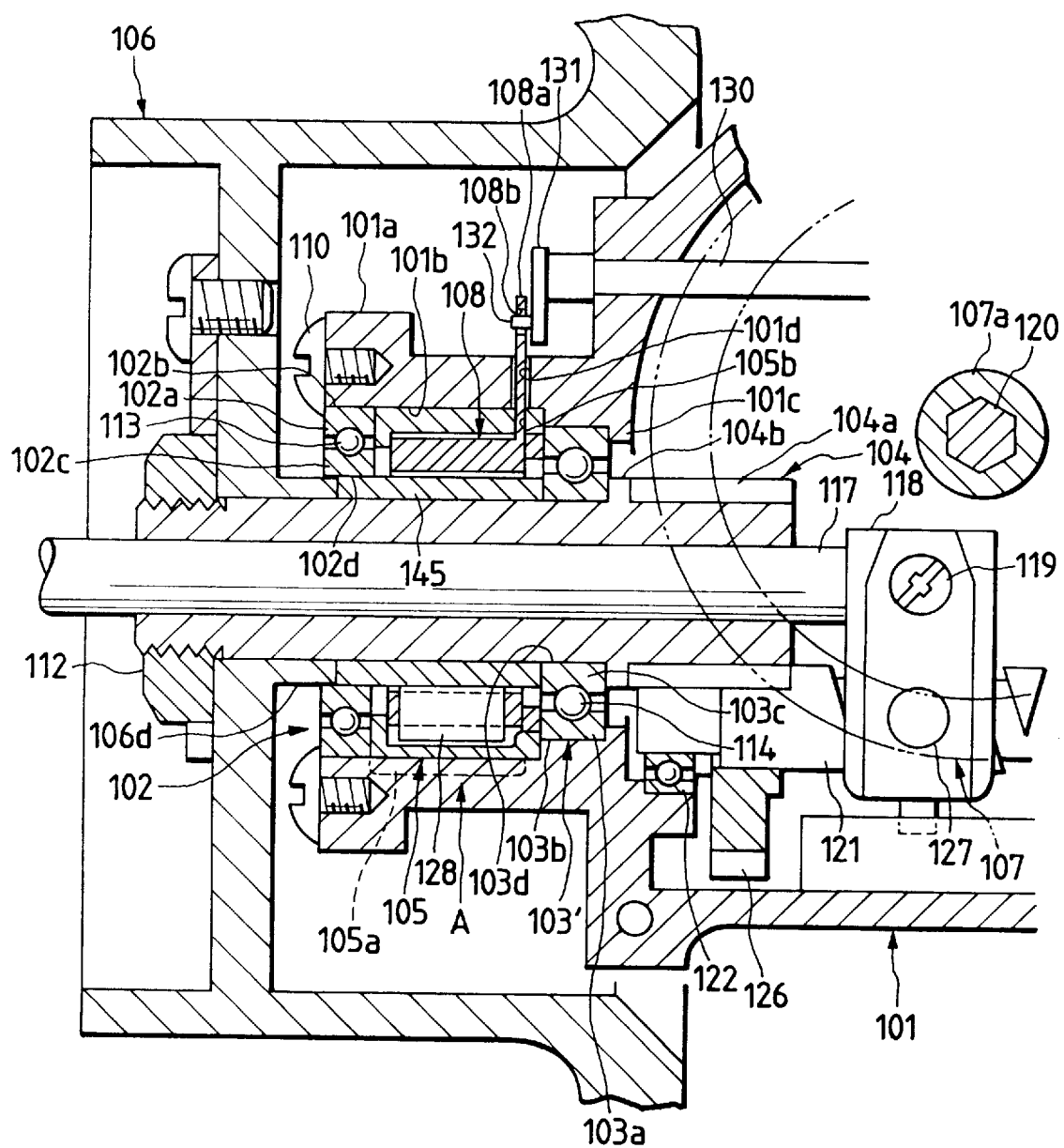
FIG. 10 is a cross-sectional side view of the primary portion of the spinning reel for fishing of a sixth embodiment.

FIG. 10 is a view showing the sixth example of the present invention.

In the spinning reel for fishing of the sixth embodiment, the cylindrical drive shaft 104 is rotatably supported in the support section 101a on the front side of the reel body 101 by the front bearing 102 made up of a rolling bearing, the rolling type one-way clutch A and the rear bearing 103' made up of a rolling bearing.

The outside portion 102b of the outer race 102a of the front bearing 102, the outside portion 105a of the outer frame 105 of the one-way clutch A and the outside portion 103b of the outer race 103a of the rear bearing 103' are fitted on the inner circumference 101b of the support portion 101a.

The abutment portion 101c on the rear side of the support section 101a comes into contact with the outer race 103a of the rear bearing 103', and the head portion of the screw 110 attached to the fore end of the support section 1a prevents the removal of the front bearing 102, the rolling type one-way clutch A and the rear bearing 103' while the outside portions 102b and 103b are axially retained in place. Further the outside portion 105a of the outer frame 105 is non-rotatably fitted on the inner circumference 101b of the support section 101a.

On the front side of the base end of the cylindrical drive shaft 104, there are integrally formed a tooth portion 104a and a abutment portion 104b. The abutment portion 104b comes into contact with the inner race 103c of the rear bearing 103'.

The inner race 103c of the rear bearing 103' is fitted on the outer circumference of the cylindrical drive shaft 104, and the long inner race 145 of the rolling type one-way clutch A and the short central cylindrical portion 106d of the rotor 106 are non-rotatably fitted on the outer circumference of the cylindrical drive shaft 104, and they are axially retained by the nut 112 screwed to the front end of the cylindrical drive shaft 104. Therefore, the inside portion 103d of the inner race 103c is axially retained in place.

The inside portion 102d of the inner race 102c of the front bearing 102 is axially movably fitted on the outer circumference of the long inner race 145 of the rolling type one-way clutch A on the outer circumference of the cylindrical drive shaft 104.

The outer diameter of the inner race 145 is somewhat larger than the outer diameter of the central cylindrical portion 106d.

Figure 11:
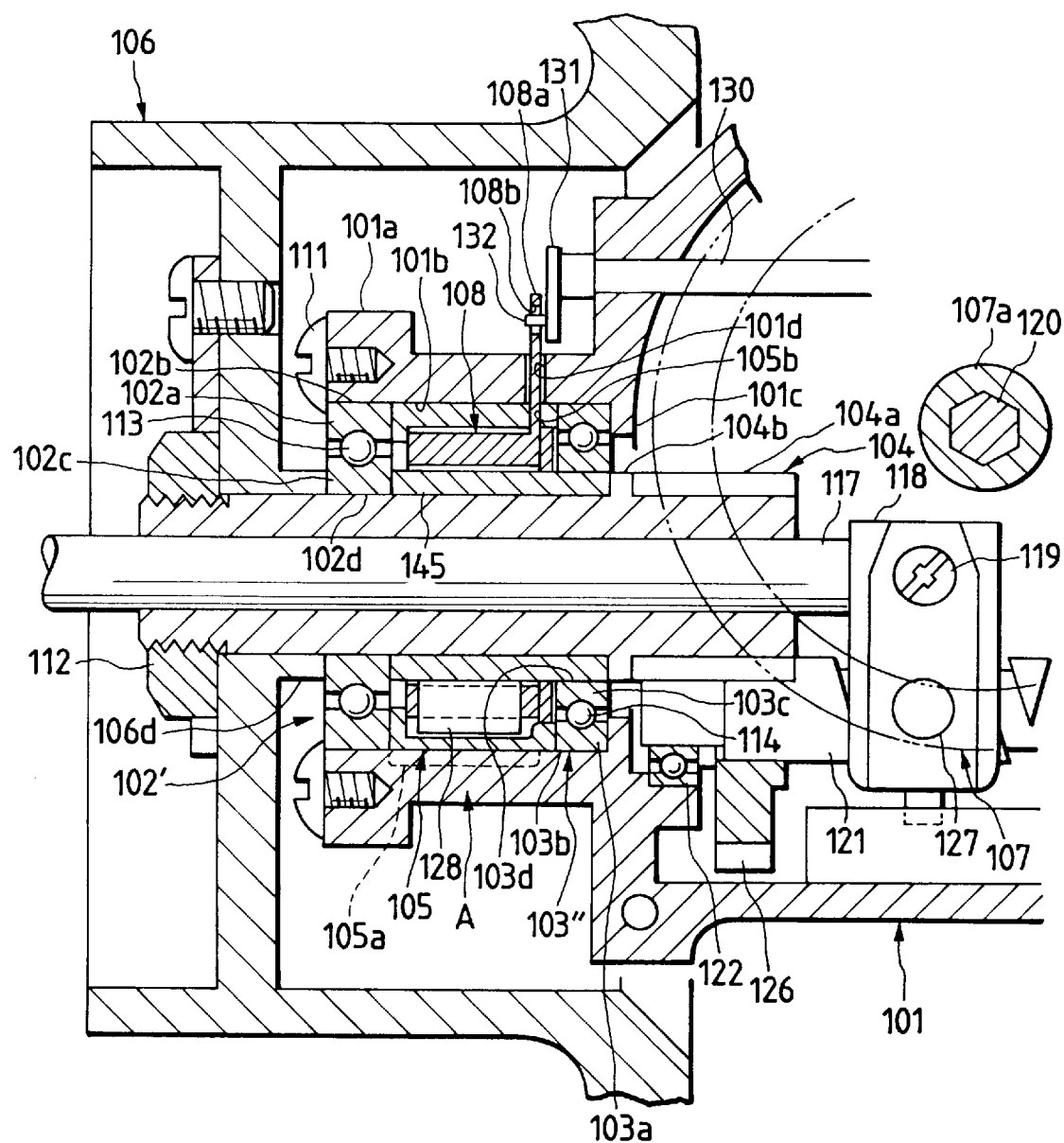
FIG. 11 is an enlarged cross-sectional side view of the primary portion of the spinning reel for fishing of a seventh embodiment.

FIG. 11 is a view showing the seventh embodiment of the present invention.

In the spinning reel for fishing of the seventh embodiment, the cylindrical drive shaft 104 is rotatably supported in the support section 101a on the front side of the reel body 101 by the front bearing 102' made up of a rolling bearing of a large diameter, the rolling type one-way clutch A and the rear bearing 103" made up of a rolling bearing of a small diameter.

The outside portion 102b of the outer race 102a of the front bearing 102', the outside portion 105a of the outer frame 105 of the one-way clutch A and the outside portion 103b of the outer race 103a of the rear bearing 103' are fitted on the inner circumference 101b of the support portion 101a.

The abutment portion 101c on the rear side of the support section 101a comes into contact with the outer race 103a of the rear bearing 103", and the head portion of the screw 110 attached to the front end of the support section 101a prevents the removal of the front bearing 102', the rolling type one-way clutch A and the rear bearing 103" while the outside portions 102b and 103b are axially retained Further, the outside portion 105a of the outer frame 105 is non-rotatably fitted on the inner circumference 101b of the support section 101a.

On the front side of the base end of the cylindrical drive shaft 104, there are integrally formed a tooth portion 104a and a abutment portion 104b. The abutment portion 104b comes into contact with the long inner race 145 of the rolling type one-way clutch A.

The outer diameter of the abutment portion 104b is somewhat smaller than the outer diameter of the long inner race 145.

The inside portion 102d of the inner race 102c of the front bearing 102' is fitted on the outer circumference of the cylindrical drive shaft 104, and the long inner race 145 of the rolling type one-way clutch A and the short central cylindrical portion 106d of the rotor 106 are non-rotatably fitted on the outer circumference of the cylindrical drive shaft 104, and they are retained by the nut 112 screwed to the front end of the cylindrical drive shaft 104. Therefore, the inside portion 102d of the inner race 102c is retained in place axially.

The inner race 103c of the rear bearing 103" is axially movable fitted on the outer circumference of the long inner race 145 of the rolling type one-way clutch A on the outer circumference of the cylindrical drive shaft 104.

The rear bearing 103" made up of a roller bearing of a small diameter may be replaced with a metal bearing or a synthetic resin bearing.

Figure 12:
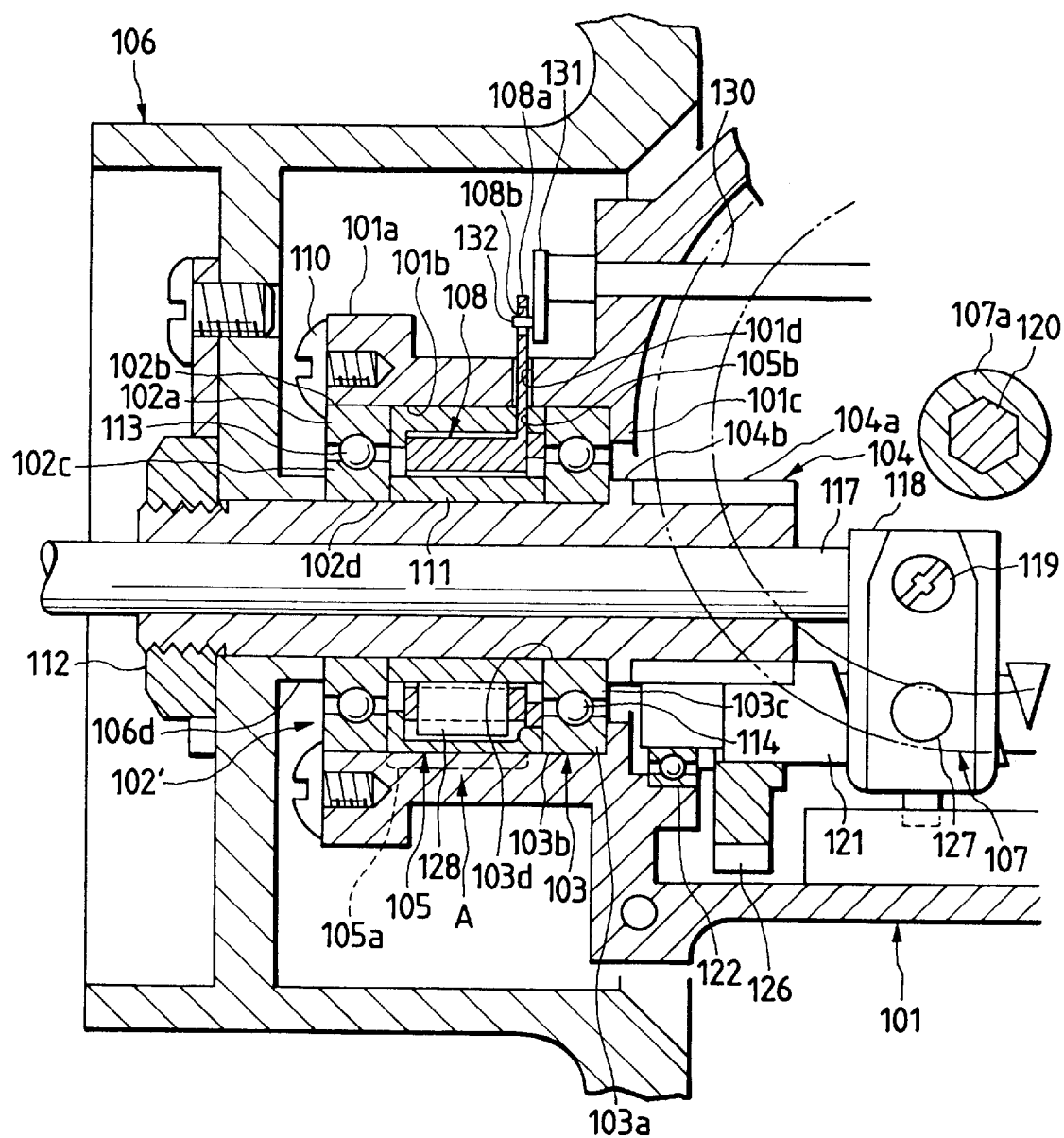
FIG. 12 is an enlarged cross-sectional side view of the primary portion of the spinning reel for fishing of an eighth embodiment.

FIG. 12 is a view showing the eight embodiment of the present invention.

In the spinning reel for fishing of the eight embodiment, the cylindrical drive shaft 104 is rotatably supported in the support section 101a on the front side of the reel body 101 by the front bearing 102' made up of a rolling bearing of a large diameter, the rolling type one-way clutch A and the rear bearing 103 made up of a rolling bearing of a large diameter.

The outside portion 102b of the outer race 102a of the front bearing 102', the outside portion 105a of the outer frame 105 of the one-way clutch A and the outside portion 103b of the outer race 103a of the rear bearing 103 are fitted on the inner circumference 101b of the support portion 101a.

The abutment portion 101c on the rear side of the support section 101a comes into contact with the outer race 103a of the rear bearing 103, and the head portion of the screw 110 attached to the front end of the support section 101a prevents the removal of the front bearing 102', the rolling type one-way clutch A and the rear bearing 103 while the outside portions 102b and 103b are retained axially. Further the outside portion 105a of the outer frame 105 is non-rotatable fitted on the inner circumference 101b of the support section 101a.

On the front side of the base end of the cylindrical drive shaft 104, there are integrally formed a tooth portion 104a and a abutment portion 104b. The abutment portion 104b comes into contact with the inner race 103c of the rear bearing 103.

The inside portion 102d of the inner race 102c of the front bearing 102' and the inside portion 103d of the inner race 103c of the rear bearing 103 are fitted on the outer circumference of the cylindrical drive shaft 104, and the inner race 111 of the rolling type one-way clutch A and the short central cylindrical portion 6d of the rotor 106 are non-rotatably fitted on the outer circumference of the cylindrical drive shaft 104, and they are retained by the nut 112 screwed to the front end of the cylindrical drive shaft 104. Therefore, the inside portion 102d of the inner race 102c and the inside portion 103d of the inner race 103c are retained axially.

Figure 13:
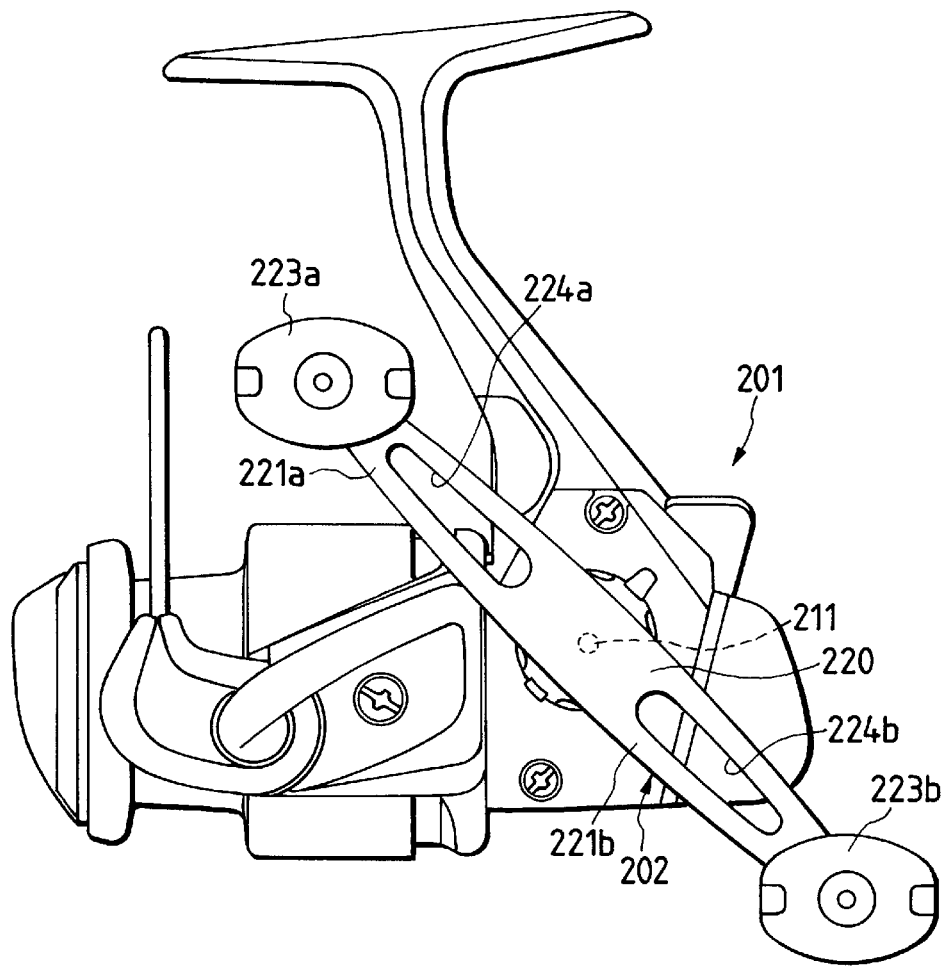
FIG. 13 is a side view of the reel for fishing in a ninth embodiment of the present invention.
Figure 14:
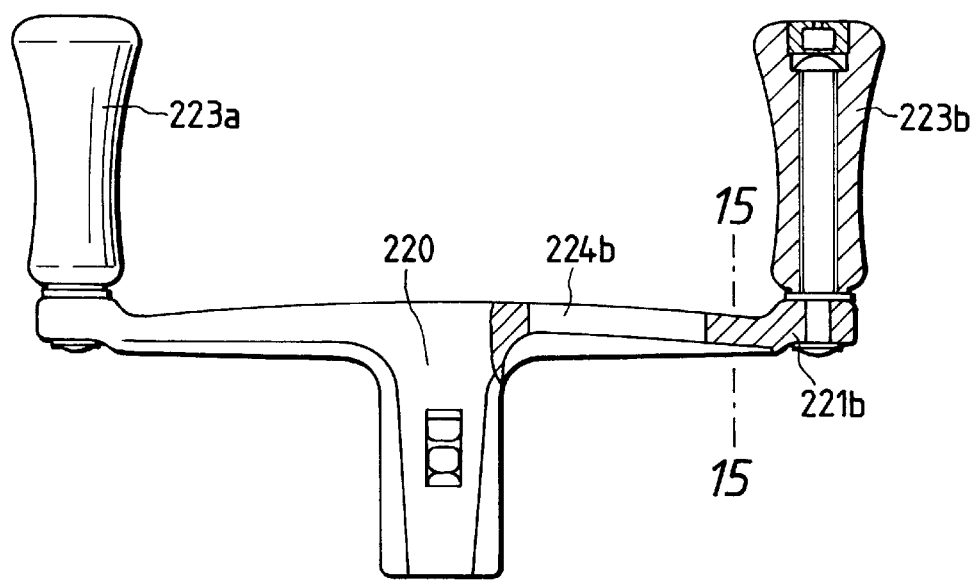
FIG. 14 is a front view of the handle portion of the reel for fishing in the ninth embodiment of the present invention.
Figure 15:
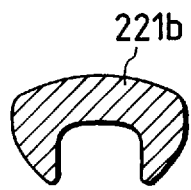
FIG. 15 is a cross-sectional view taken on line 15—15 in FIG. 14.

FIG. 13 is a view showing the ninth embodiment of the present invention. A drive shaft of the winding drive mechanism protrudes onto one side of the reel body 201. The handle body 202 is fixed to the drive shaft.

The handle body 202 is of the double handle type, that is, the handle body 202 includes: a connecting portion 220 which is attached to a drive shaft 211 of the winding drive mechanism housed in the reel body 201; and arm portions 221a, 221b extending from the connecting portion 220. Handle knobs 223a, 223b to be operated by a fisher man are rotatably attached to the ends of these arm portions 221a, 221b.

In the arm portions 221a, 221b, long and slender through-spaces 224a, 224b are formed in a portion from the connecting portion 220 to the respective ends by means of punching. When these through-spaces 224a, 224b are formed, the weight of the arm portions can be reduced, and moment of inertia can be lowered.

The arm portions 221a, 221b may be formed into a plate-shape. Alternatively, sections of the thick portions of the arm portions 221a, 221b may be formed into a U-shape. Due to the foregoing, it is possible to reduce the weight of the arm portions while the mechanical strength is maintained.

Figure 16:
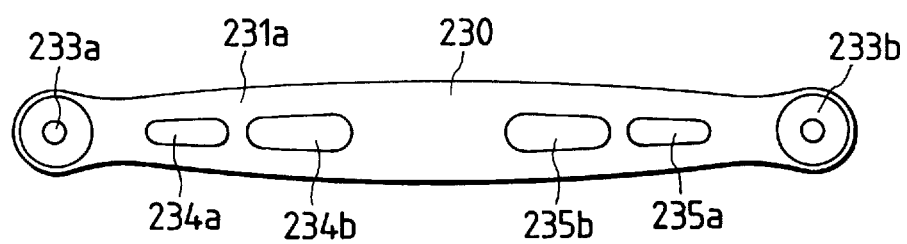
FIG. 16 is a side view of the handle portion of the reel for fishing in a tenth embodiment of the present invention.
Figure 17:
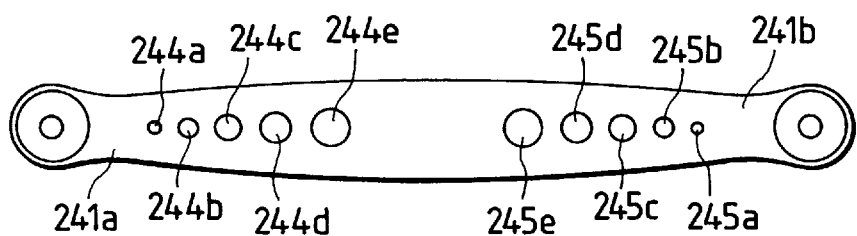
FIG. 17 is a side view of the handle portion of the reel for fishing in an eleventh embodiment of the present invention.

In the ninth embodiment described above, each through-space 224a, 224b is made up of one long hole formed in a portion from the connecting portion 220 to each end at which each handle knob 223a, 223b is attached. In the tenth embodiment of the present invention illustrated in FIG. 16, one through-space formed in each arm portion 231a, 231b is longitudinally divided into two through-spaces 234a, 234b, 235a, 235b. In this connection, in the present invention, a plurality of through-holes may be formed in each arm portion 221a, 221b and arranged substantially in parallel to each other In this connection, in the eleventh embodiment of the present invention illustrated in FIG. 17, large and small circular through-spaces 244a to 244e, 245a to 245e may be aligned in a line. Further, in the present invention, two or more lines of these circular through-spaces may be arranged. Furthermore, in the present invention, these circular through-spaces may not be arranged in a line but they may be dotted. The shape of the through-space is not necessarily circular but it may be formed elliptical or rectangular. Alternatively, the linear through-space shown in the ninth embodiment may be combined with the circular, elliptical or rectangular through-space.

The arm portion is formed into a plate-shape, and the through-space is formed in the arm portion. However, it should be noted that the present invention is not limited thereto. The arm portion may be made up of two rods, and beams may be arranged at appropriate positions between the rods. That is, the connecting portion with the drive shaft is formed in the central beam portion, and the handle knob is attached to the end beam portion. When the reinforcing beams are arranged in other portions, the mechanical strength of the arm can be more enhanced.

In this connection, the present invention has been accomplished so that it can be applied to a spinning reel. Of course, the structure shown can be applied to a handle of the two bearing type reel.

As described above, even in the double handle type reel for fishing, the following effects can be provided. There is formed a through-space in the arm portion of the handle body. Consequently, the weight can be reduced, and the moment of inertia can be reduced. Therefore, it is possible to prevent the fishing line from being wound excessively by an overrun of the handle in the winding operation. Further, when the reel is attached to the fishing rod, deviation of the weight on the handle side can be reduced. Therefore, the winding property of the reel can be enhanced.

In case of the pinning reel, in addition to the above effect, it is possible to prevent an erroneous returning motion of the bail during casting of the fishing line. Consequently, the fishing operation property can be more enhanced.

In case where the arm portion is formed as a V-shape in section, it is possible to increase the mechanical strength of the arm portion of the handle body.

What is claimed is:

1. A spinning reel for fishing comprising:

a reel body, a cylindrical drive shaft;

a handle linked to said cylindrical drive shaft for rotating said cylindrical drive shaft;

a spool shaft inserted into said cylindrical drive shaft;

a front bearing having an outer portion and an inner portion;

a rear bearing having an outer portion and an inner portion said front and rear bearings disposed in a support section formed on a front side of said reel body for rotatable supporting said cylindrical drive shaft;

a rotor attached to the cylindrical drive shaft, the rotor having a fishing line guide section for winding a fishing line around a spool disposed at a front section of the spool shaft; wherein, said outer portions of the front and the rear bearings are axially retained on the support section of the reel body, said inner portion of either of the front and the rear bearings is axially retained on the cylindrical drive shaft, and said remaining inner portion of either of the front and the rear bearings is disposed on the cylindrical drive shaft so as to be axially movable.

2. A spinning reel for fishing according to claim 1, wherein at least one of the front and the rear bearings comprises a rolling bearing.

3. A spinning reel according to claim 1, wherein said bearing having an inner portion which is axially movable has a rolling bearing smaller in diameter than said bearing having an inner portion which is axially retained.

4. A spinning reel according to claim 1, further comprising a collar disposed around said cylindrical drive shaft, and wherein said inner portion of said bearing which is axially movable is disposed on said collar.

5. A spinning reel according to claim 1, further comprising a rolling type one-way clutch disposed axially between said front and said rear bearings.

* * * * *